United States Patent
Mori et al.

(10) Patent No.: US 7,369,286 B2
(45) Date of Patent: May 6, 2008

(54) HOLOGRAM RECORDING MEDIUM, AND RECORDING APPARATUS AND REPRODUCING APPARATUS FOR THE SAME

(75) Inventors: Kazushige Mori, Yokohama (JP); Kazuhiko Kimura, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 11/072,393

(22) Filed: Mar. 7, 2005

(65) Prior Publication Data

US 2005/0200928 A1    Sep. 15, 2005

(30) Foreign Application Priority Data

Mar. 9, 2004    (JP)    ............................. 2004-065842
Sep. 9, 2004    (JP)    ............................. 2004-262932

(51) Int. Cl.
*G03H 1/02*    (2006.01)

(52) U.S. Cl. ................. 359/3; 359/10; 359/35

(58) Field of Classification Search .................... None
See application file for complete search history.

(56) References Cited

U.S. PATENT DOCUMENTS 5,648,857 A * 7/1997 Ando et al. ................... 359/12
5,917,798 A   6/1999 Horimai et al.
6,108,110 A   8/2000 Orlov et al.
2003/0039001 A1* 2/2003 King et al. .................... 359/35
2004/0165518 A1   8/2004 Horimai et al.

FOREIGN PATENT DOCUMENTS

EP    1 065 658 A1    1/2001
EP    1 306 732 A1    5/2003
EP    1 324 322 A1    7/2003

OTHER PUBLICATIONS

Written Opinion and Search Report issued in International Patent Application No. PCT/KR2005/000633 on Jul. 12, 2005.

* cited by examiner

*Primary Examiner*—Arnel Lavarias
(74) *Attorney, Agent, or Firm*—Stein, McEwen & Bui, LLP

(57) ABSTRACT

A hologram recording medium, and a recording apparatus and a reproducing apparatus for the same, by which scattered beam noise is minimized and recording capacity is increased using spatial separation and polarization separation in an optical system where a reference beam and an object beam travel through the same optical path. The provided hologram recording medium includes a recording layer into which an object beam and a reference beam are radiated to record data of the object beam as interference fringes, and first and second phase difference layers arranged above and below the recording layer, respectively, to convert the polarization of an incident beam.

8 Claims, 6 Drawing Sheets

HOLOGRAM RECORDING MEDIUM, AND RECORDING APPARATUS AND REPRODUCING APPARATUS FOR THE SAME

CROSS-REFERENCE TO RELATED APPLICATIONS

This application claims the priority of Japanese Patent Application No. 2004-65842, filed on Mar. 9, 2004 in the Japanese Patent Office, and Japanese Patent Application No. 2004-262932, filed on Sep. 9, 2004 in the Japanese Patent Office, the disclosures of which are incorporated herein by reference.

BACKGROUND OF THE INVENTION

1. Field of the Invention

The present invention relates to a recording medium, and, more particularly, to a hologram recording medium on which data is recorded as interference fringes via the use of an object beam and a reference beam. The present invention also relates to a recording apparatus and a reproducing apparatus to record/reproduce data on a hologram recording medium.

2. Description of the Related Art

A hologram recording method in which data is recorded on a recording medium by using holography is performed by simultaneously irradiating an object beam and a reference beam. The object beam has image data to be recorded in a hologram recording medium. The simultaneous irradiation of these beams causes interference fringes to be written onto the hologram recording medium. When reproducing data from a hologram recording medium, the same reference beam as used in the recording operation is radiated onto the hologram recording medium and the image data recorded on the hologram recording medium is reproduced by detecting a diffraction that is caused by the interference fringes.

In another hologram recording method, the interference fringes discussed above may be three-dimensionally recorded by additionally utilizing a thickness direction of the hologram recording medium. The hologram recording medium then has a remarkably increased recording capacity compared to a surface two-dimensional recording medium, such as a CD or a DVD, due to the hologram recording medium having an ability to re-record overlapping two-dimensional image data on the same region.

A hologram recording and/or reproducing apparatus is a type of interference system using interference between an object beam and a reference beam. In such an interference system, irradiating two beams stably is difficult. This difficulty has led to various studies aimed at overcoming this drawback. One solution employs a fine step measuring apparatus in which an optical system, referred to as a common optical path-type interference system, has been used. In such an optical system, two beams are transferred along the same optical path. Thus, changes in optical path due to disturbances, such as vibration or air turbulence, affect both beams equally and thus are cancelled. Accordingly, a stable apparatus, which is not affected by changes in optical path, may be realized.

One example of such an optical system which is widely used is a Normarski interference system or a Normarski microscope. In addition, in a common optical path-type interference system, since two beams propagate through the same optical path, the optical system may be formed with a simple structure and a small size.

FIG. 12 is a perspective view of an optical system in a conventional hologram recording and/or reproducing apparatus, an example of which is disclosed in U.S. Pat. No. 6,108,110. Referring to FIG. 12, a spatial light modulator (SLM) is arranged around the center of an optical system to display recorded data, which is converted into a two-dimensional digital image. In the SLM shown in FIG. 12, the light beam's intensity is modulated to carry information and serve as an object beam.

As shown in FIG. 12, a reference beam is arranged at a position outside of the object beam. The object beam and the reference beam are irradiated in a hologram recording medium to record interference fringes. The hologram recording medium is rotated during recording so that data from the object beam is multiplex-recorded on the hologram recording medium. When reproducing data from the hologram recording medium, a beam output from the SLM is blocked and the reference beam is radiated onto the interference fringes for a two-dimensional image sensor, such as a CCD, to receive image data reproduced from the interference fringes and to reproduce data.

Since a large amount of image data is multiplex-recorded on the same region of a hologram recording medium using this hologram recording method, the capacity of the hologram recording medium may be increased by increasing a thickness thereof. However, the recording capacity of the hologram recording medium is, in fact, limited for various reasons, and if a beam emitted by an optical device is scattered, for example, by an astigmatic lens or the hologram recording medium itself, a serious problem results.

In general, as the number of multiplex images (i.e., the number of the interference fringes), increases, the diffraction efficiency of a reproduction beam, which is diffracted at each of the interference fringes, rapidly drops. On the other hand, when a beam is radiated onto an optical device, such as a lens, or a hologram recording medium, a scattered beam is generated due to the roughness of the surface or unevenness of the material of the hologram recording medium. Preventing beam scattering is therefore substantially impossible. Thus, an image sensor picks up a scattered beam mixed with a reference beam. In addition, the scattered beam is optical noise and interferes with detection of a reproduction beam whose diffraction efficiency is low. Accordingly, the maximum recording capacity of a hologram recording medium is determined by the ratio of the optical intensity of a reproduction beam to the optical intensity of a scattered beam, in other words, an S/N ratio.

Since the reference beam and the object beam are transferred along the same optical path in the conventional system of FIG. 12, the apparatus may be stable and small. However, because of the common optical path, the scattered beam may be easily input to an image sensor. Accordingly, the common optical path-type hologram recording and/or reproducing optical system of FIG. 12 cannot substantially increase a recording capacity.

FIG. 10 is a graph illustrating the relationship between numerical aperture (NA) of an objective lens and number of multiplexed holograms, when 0.2 tera-bytes, 0.5 tera-bytes, and 1 tera-bytes of data are to be recorded on a hologram recording medium having the same recording area as a CD. When the NA of a conventional objective lens is determined to be 0.5, the numbers of multiplex holograms are 400, 1,000, and 2,000 for 0.2 tera-bytes, 0.5 tera-bytes, and 1 tera-bytes of data, respectively.

FIG. 11 is a graph illustrating the relationship between diffraction efficiency and number of multiplexed holograms. Diffraction efficiency ($\eta$) is calculated by dividing an M number (M#), which denotes the characteristic of a recording material, by a hologram multiplexing number (M) and squaring the result. For example, when the M number of a conventional hologram recording material is 5 and the hologram multiplex numbers are 1,000 and 2,000, the diffraction efficiency is $2.5\times10^{-5}$ and $6.3\times10^{-6}$, respectively.

FIG. 9 is a graph illustrating the relationship between amount of scattered light, which is measured in a conventional hologram disk storage system of FIG. 12, and diffraction efficiency ($\eta$). Referring to FIG. 9, the minimum diffraction efficiency is $1\times10^{-2}$ due to scattered beams in the conventional system, and a diffraction efficiency as small as $1\times10^{-5}$, which is required to achieve tera-byte recording capacity, cannot be detected.

In the conventional system of FIG. 12, the object beam is located at the center of the optical system and the reference beam surrounds the object beam such that the two beams are separated spatially. However, in this configuration, a scattered beam may propagate in every direction. Thus, eliminating the scattered beam by simply spatially separating the reference beam and the object beam is difficult.

SUMMARY OF THE INVENTION

Aspects of the present invention provide a hologram recording medium, and a recording apparatus and a reproducing apparatus to be used with the hologram recording medium, which minimize scattered beam noise and increase recording capacity by using a polarized beam in addition to spatial separation, in an optical system wherein a reference beam and an object beam travel the same optical path.

According to an aspect of the present invention, there is provided a hologram recording medium comprising a recording layer into which an object beam and a reference beam are radiated to record data of the object beam as interference fringes, and first and second phase difference layers arranged above and below the recording layer, respectively, to convert the polarization of an incident beam.

According to an aspect of the present invention, the polarizations of the object beam and the reference beam are converted by the first and second phase difference layers.

According to an aspect of the present invention, the polarizations of the object beam and the reference beam are controlled to be different from each other until the object beam and the reference beam meet in the recording layer by reflecting the object beam from the reflection layer and transmitting the object beam through the second phase difference layer twice.

According to an aspect of the present invention, in the recording layer, the polarizations of the object beam and the reference beam are the same so that interference fringes may be formed.

According to an aspect of the present invention, the hologram recording medium further comprises a reflection layer formed directly below the second phase difference layer.

According to an aspect of the present invention, the reflection layer selectively reflects the object beam.

According to an aspect of the present invention, since the reflection layer is formed directly beneath the second phase difference layer, the object beam and the reference beam are perpendicular in polarization in all layers of the recording medium other than the recording layer and have the same polarization in the recording layer.

According to an aspect of the present invention, since the reflection layer selectively reflects the object beam, the object beam and the reference beam are separated to minimize scattered beam noise.

According to an aspect of the present invention, the hologram recording medium further comprises a filter layer formed directly below the reflection layer, to absorb the reference beam.

According to an aspect of the present invention, since the filter layer absorbs the reference beam passing through the reflection layer, the object beam and the reference beam are separated to minimize scattered beam noise.

According to aspects of the present invention, the hologram recording medium is formed in a disk shape hologram recording medium or is formed in a card shape.

According to an aspect of the present invention, the recording and/or reproducing of data on the hologram recording medium may be performed by using a conventional optical disc recording/reproducing apparatus.

According to an aspect of the present invention, the hologram recording medium may be applied to various fields.

According to an aspect of the present invention, the hologram recording medium is be formed in a tape shape.

According to another aspect of the present invention, there is provided a recording apparatus to record data on the hologram recording medium, wherein the object beam and the reference beam travel the same optical path, and the object beam and the reference beam have the same polarization in the recording layer but perpendicular polarizations in every other layer except the recording layer.

According to still another aspect of the present invention, there is provided a reproducing apparatus to reproduce data from the hologram recording medium, wherein the object beam and the reference beam travel the same optical path, and the object beam and the reference beam have the same polarization in the recording layer but perpendicular polarizations in every other layer except the recording layer.

According to still another aspect of the present invention, there is provided a recording/reproducing apparatus to record/reproduce data on/from the hologram recording medium, wherein the object beam and the reference beam travel the same optical path, and the object beam and the reference beam have the same polarization in the recording layer but perpendicular polarizations in every other layer except the recording layer.

According to an aspect of the present invention, since the polarizations of the object beam and the reference beam are perpendicular to each other in all layers of the recording medium except the recording layer, and a scattered beam generated from the reference beam has the same polarization as the reference beam, the scattered beam may be easily eliminated by a polarized beam separation device, such as an analyzer.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
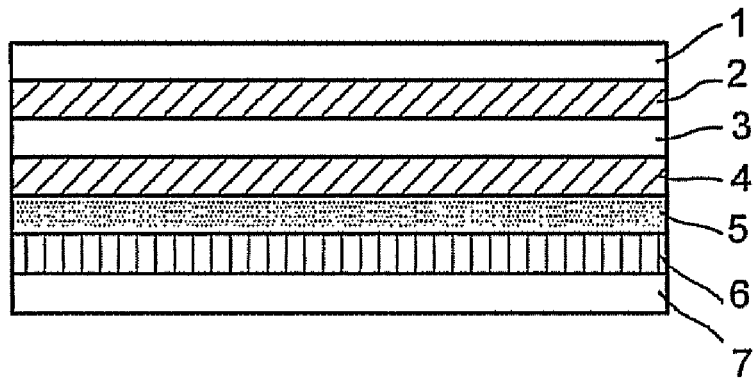
FIG. 1 is a cross-section of a hologram recording medium according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a cross-section of a hologram recording medium according to an embodiment of the present invention. Referring to FIG. 1, a hologram recording medium D according to an exemplary embodiment of the present invention includes sequentially a cover layer 1, a phase difference layer A (λ/4 layer) 2, a recording layer 3, a phase difference layer B (λ/4 layer) 4, a cholesteric liquid crystal filter 5, a color filter 6, and a substrate 7. However, it is understood that additional layers can be used and that ones of the layers need not be used in all aspects of the invention.

As shown, the phase difference layers 2 and 4 convert a polarization of an incident beam. For example, the layers 2 and 4 convert a left circular-polarized beam, a right circular-polarized beam, an S-polarized beam, and a P-polarized beam into an S-polarized beam, a P-polarized beam, a right circular-polarized beam, and a left circular-polarized beam, respectively. While not required in all aspects, the recording layer 3 may be formed of a photo polymer. An object beam and a reference beam are radiated onto the same portion of the recording layer 3 to record data of the object beam as interference fringes.

The cholesteric liquid crystal filter 5 is formed of a cholesteric liquid crystal having a periodic spiral molecular structure and selectively reflects light of a wavelength determined by the period of its spiral molecular structure. For example, a right circular cholesteric liquid crystal has circular dichroism that tends to reflect right circular-polarized beams and transmit left circular-polarized beams.

The color filter 6 is an optical device which absorbs a recording/reproducing beam. The cover layer 1 protects the inside of the hologram recording medium. The substrate 7 is the base of the hologram recording medium.

Figure 2:
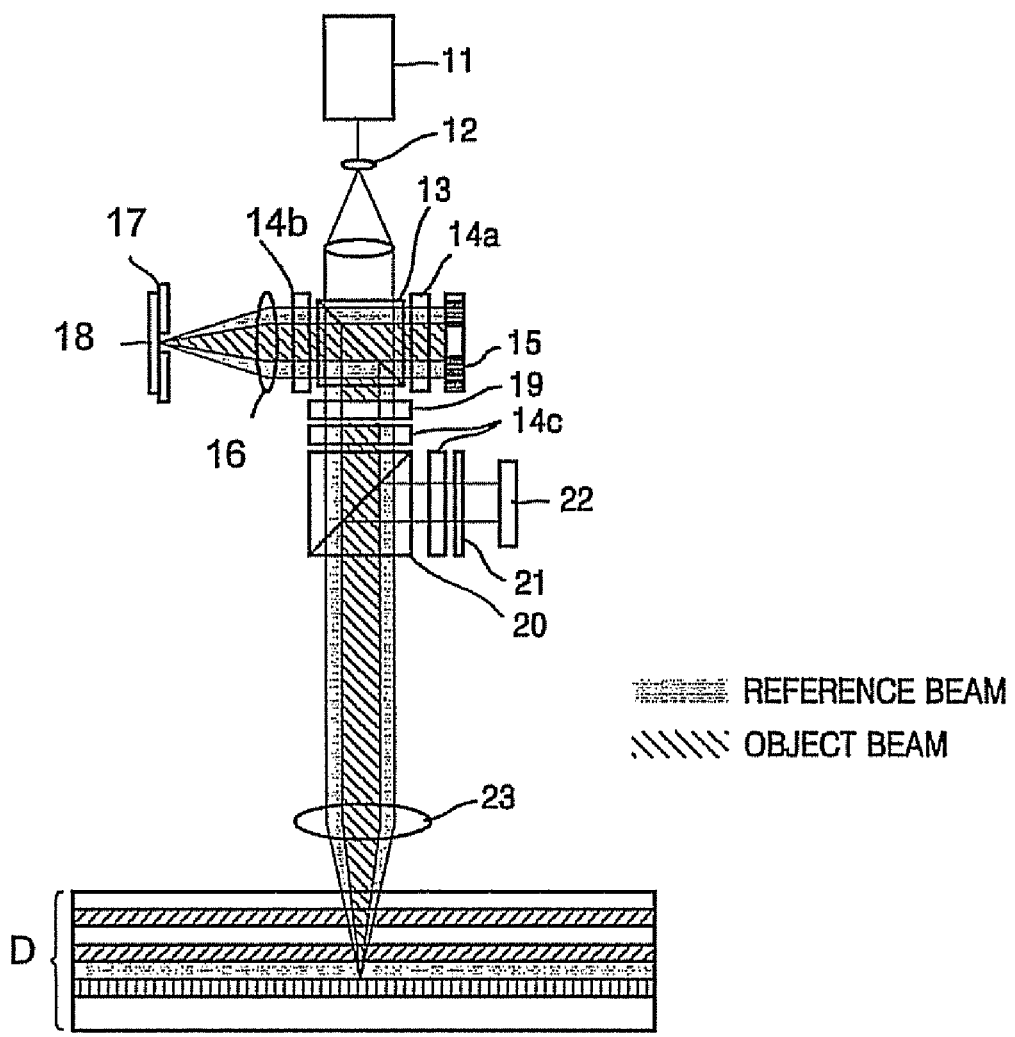
FIG. 2 is a sectional view of an optical system of a recording and/or reproducing apparatus according to the embodiment of the present invention.

FIG. 2 is a sectional view of an optical system of a recording and/or reproducing apparatus according to an embodiment of the present invention. Referring to FIG. 2, an optical system of a recording and/or reproducing apparatus includes a semiconductor laser 11 as a light source, a beam expander 12, a polarized beam splitter (PBS) 13, λ/4 plates 14a, 14b, and 14c, a spatial light modulator (SLM) 15 that generates an object beam, a focusing lens 16, an iris 17, a mirror 18, a λ/2 layer 19, a beam splitter 20, an analyzer 21, an image sensor 22, and an objective lens 23. The beam expander 12 expands the diameter of a laser beam radiated from the semiconductor laser 11. The PBS 13 polarizes and divides an incident beam into two or more polarized beams. The λ/4 plates 14a, 14b, and 14c convert the polarization of an incident beam, and the focusing lens 16 focuses an incident beam. The iris 17 has a circular hole at the focus of the focusing lens 16. The mirror 18 reflects a beam transmitted through the iris 17. The λ/2 plate 19 converts the polarization of an incident beam, and the beam splitter 20 divides an incident beam into two or more beams. The analyzer 21 removes a polarization state that is perpendicular to a reproduction beam, and the image sensor 22 receives the reproduction beam. In addition, the objective lens 23 focuses the incident beam to form an image on the recording layer 3 of the hologram recording medium. In this case, it is understood that a laser other than a semiconductor laser may be used as long as a wavelength thereof is appropriate to the hologram recording medium.

Recording and reproducing of data on the hologram recording medium will now be described with reference to FIGS. 2 through 6.

The semiconductor laser 11 outputs a polarized (for example, s-polarized) laser beam to record data on and/or reproduce data from the hologram recording medium. The beam expander 12 expands the diameter of the laser beam output from the semiconductor laser 11, and the PBS 13 reflects the laser beam. The λ/4 plate 14a converts the reflected laser beam into a right circular-polarized beam, and the converted beam is input to the SLM 15.

Figure 3:
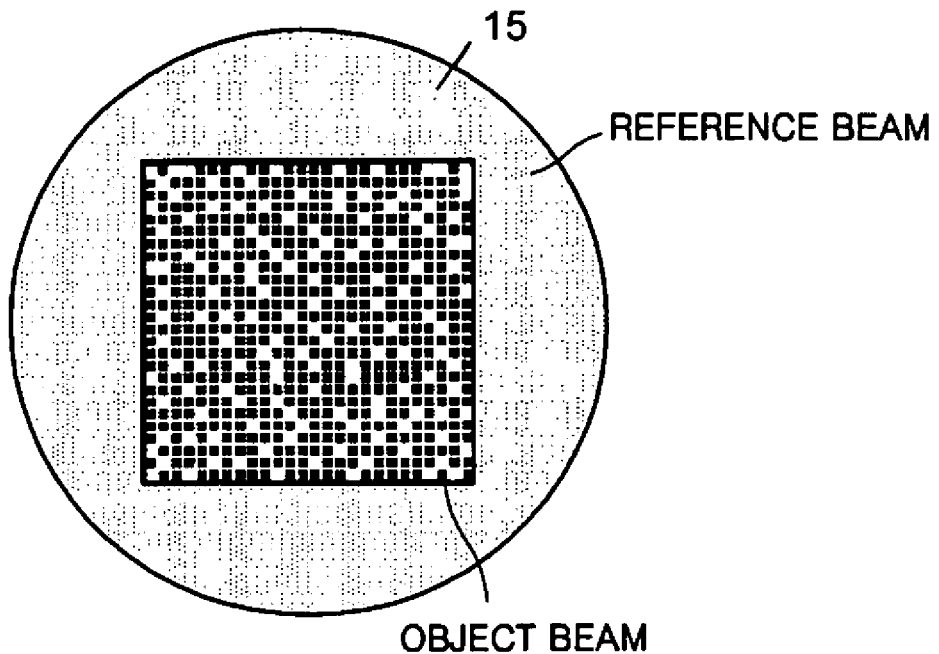
FIG. 3 is a plane view of an image surface according to the embodiment of the present invention.

An object beam and a reference beam are, thus, arranged on an image surface of an optical system, as shown in FIG. 3. In FIG. 3, the object beam is located at the center of the optical system and the reference beam surrounds the object beam. However, it is understood that this configuration of the object beam and the reference beam may be reversed. Moreover, the object beam of FIG. 3 occupies a rectangular area. However, again, it is understood the area may be alternately shaped, such as, circular or other shapes.

Data to be recorded on the hologram recording medium is previously converted into two-dimensional digital data based on a predetermined coding logic, and such image data is displayed on the SLM 15. In order to realize a large multiplex in a shift multiplex operation, the reference beam should either be a randomly phase-modulated speckle beam or a randomly intensity-modulated speckle beam. In the case shown in FIG. 3, a speckle beam generated from a diffusion plate arranged at the outside of the SLM 15 may be used as the reference beam.

In order to generate such a speckle beam, a spatial phase modulator using either liquid crystal or a specially designed optical device called a random phase plate, may be used. Alternatively, a speckle beam generated by using the same SLM 15 that displays the object beam to display a random pattern at the outside of the object beam may be used as the reference beam.

When both the object beam and the reference beam are displayed on one SLM 15 and a reflection-type liquid crystal display is used as the SLM 15, the SLM 15 operates as a $\lambda/4$ plate. Thus, when the SLM 15 provides such an operation, the $\lambda/4$ plate 14a arranged between the PBS 13 and the SLM 15 may be omitted. In the case where a digital micro-mirror device (DMD) is used as the SLM 15, however, the $\lambda/4$ plate 14a is necessary for the incident beam to be perpendicular to a polarized beam.

Whatever method is used, light of the object beam and the reference beam that is reflected from the image surface becomes P-polarized and penetrates the PBS 13. The beam of light transmitted through the PBS 13 is then transmitted through another $\lambda/4$ plate 14b and is focused by the focusing lens 16. The circular iris 17 and the mirror 18 are arranged at the focal point of the focusing lens 16. Here, the focal point of the focusing lens 16 and the focal point of the objective lens 23 in the hologram recording medium have a conjugate relationship. In addition, the iris 17 located at the focal point eliminates unnecessary beams, such as higher order diffracted or scattered beams, so as to prevent an increase in the size of the hologram.

Figure 4:
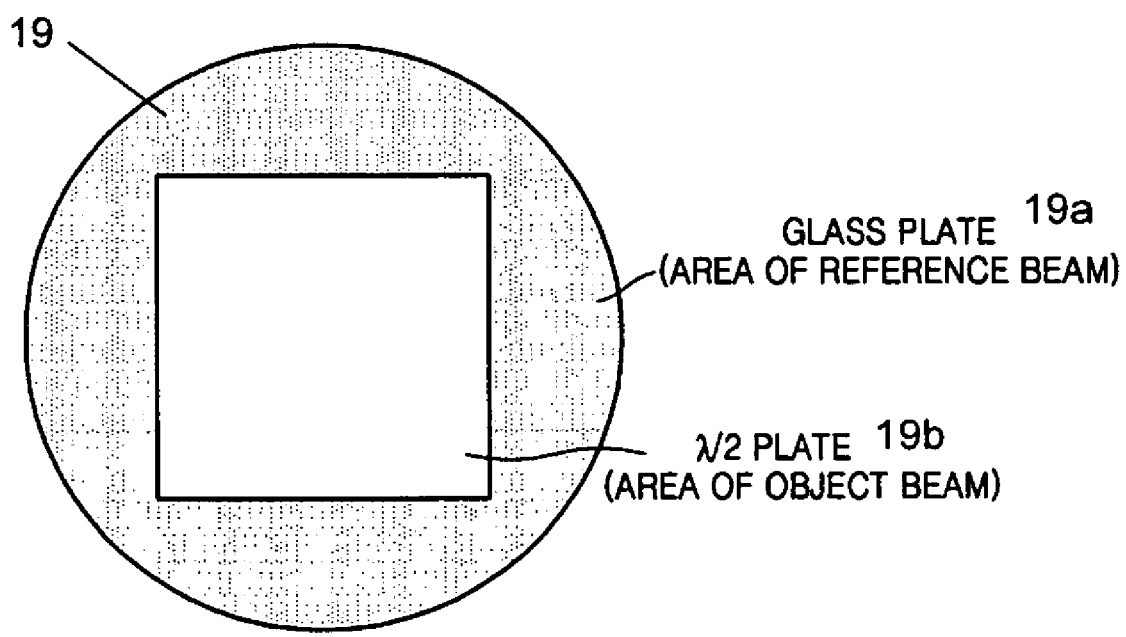
FIG. 4 is a plane view of a λ/2 plate according to the embodiment of the present invention.

The beam reflected by the mirror 18 returns to the $\lambda/4$ plate 14b where the returning beam is converted from a P-polarized beam back into an S-polarized beam. Then, the beam is reflected by the PBS 13 to form an image at a conjugate location of the SLM 15. At the image surface, the $\lambda/2$ wavelength plate 19 shown in FIG. 4 is located corresponding to the arrangement of the reference beam and the object beam of FIG. 3. In this case, the polarizations of the reference beam and object beam are perpendicular to each other. Furthermore, the $\lambda/2$ plate 19b is arranged in the area of the object beam and a glass plate 19a is arranged in the area of the reference beam in the example of FIG. 4. However, it is understand that the configuration of these layers may be reversed.

The reference beam and the object beam transmitted through the wavelength plate 19 are further transmitted through the $\lambda/4$ plate 14c. Thus, the object beam is converted into a left circular-polarized beam and the reference beam is converted into a right circular-polarized beam. In addition, the object beam and the reference beam pass through the beam splitter 20 and then are focused in the hologram recording medium by the objective lens 23.

A recording operation in which a polarized beam is used to record data in a hologram recording medium as interference fringes will now be described with reference to FIG. 5. The object beam input to a hologram recording medium is a left circular-polarized beam (L) and becomes an S-polarized beam at the recording layer 3 due to passing through the phase difference layer A ($\lambda/4$ layer) 2. Subsequently, the S-polarized beam becomes a right circular-polarized beam (R) by passing through the phase difference layer B ($\lambda/4$ layer) 4 located under the recording layer 3.

Figure 5:
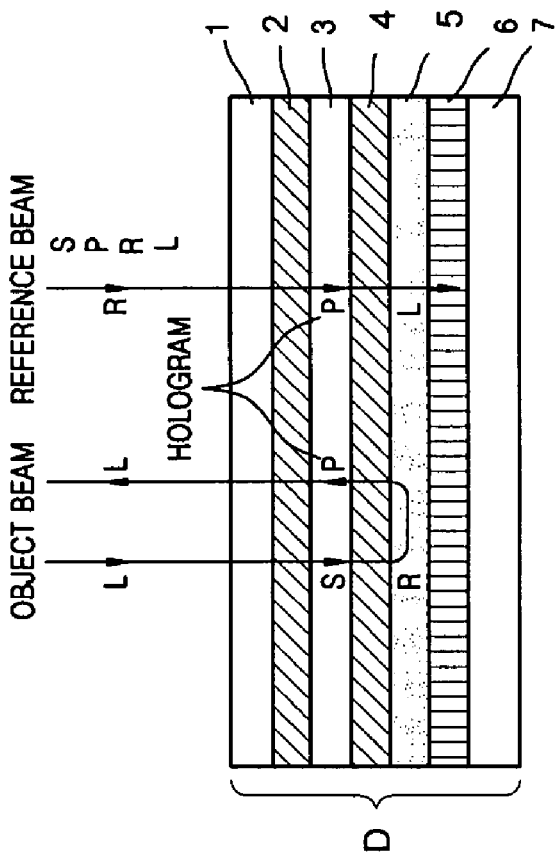
FIG. 5 illustrates a recording operation in a recording apparatus according to the embodiment of the present invention.

Furthermore, when the cholesteric liquid crystal material of FIG. 5 is formed in a right spiral arrangement, the right circular-polarized object beam R is reflected from the cholesteric liquid crystal filter 5. When the object beam is then transmitted back though the phase difference layer B 4, the object beam is converted into a P-polarized beam which is perpendicular in polarization to the incident beam in the recording layer 3.

Meanwhile, the reference beam input to the hologram recording medium is a right circular-polarized beam R, which is perpendicular in polarization to the object beam. When the reference beam passes through the phase difference layer A 2, the reference beam becomes a P-polarized beam. Thus, the P-polarized object beam and reference beam interfere with each other and the interference fringes are recorded in the recording layer 3.

The reference beam, passing through the phase difference layer A 2 and the phase difference layer B 4, is converted into a left circular-polarized beam L. Since the cholesteric liquid crystal filter 5 transmits left circular-polarized light, the reference beam is incident on the color filter 6 underlying the cholesteric liquid crystal filter 5. The color filter 6 absorbs the input reference beam.

Figure 6:
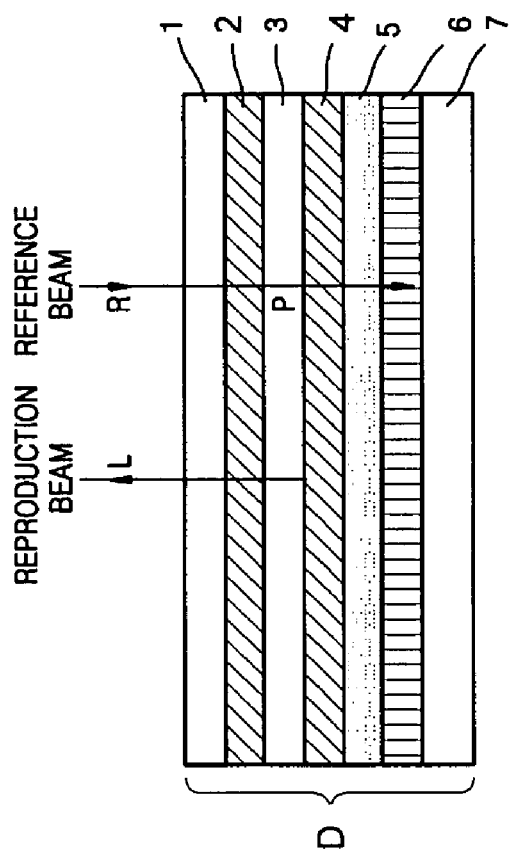
FIG. 6 illustrates a reproducing operation in a reproducing apparatus according to the embodiment of the present invention.

A reproducing operation in which a polarized beam is used to reproduce data recorded as interference fringes in the hologram recording medium will now be described with reference to FIG. 6. A reference beam in the reproducing operation is substantially similar to the reference beam in the recording operation. When the reference beam is radiated onto the interference fringes recorded in the hologram recording medium, the object beam recorded in the recording operation is reproduced from the interference fringes by diffraction. While the reproduction beam is generated from a right circular-polarized reference beam R, since the reproduction beam has the same polarization as the reference beam returning back to the phase difference layer A 2, the reproduction beam becomes a left circular-polarized beam L, perpendicular in polarization to the reference beam, when exiting the hologram recording medium.

The reproduction beam returns in the opposite direction from the input direction of the optical system of FIG. 2, passes through the objective lens 23, is reflected from the beam splitter 20, becomes a straight polarized beam on the $\lambda/4$ plate 14c, passes through the analyzer 21, and is received by the image sensor 22, such as a CCD.

The portion of the reference beam not converted into the reproduction beam passes through the cholesteric liquid crystal filter 5 to be absorbed by the underlying color filter 6. Accordingly, since there is no reference beam propagating toward the image sensor at a detection side, scattered beam noise is repressed. In addition, the surface reflection element of the hologram recording medium is perpendicular in polarization to the reproduction beam. Thus, this beam is eliminated by the analyzer 21 located at the front of the image sensor 22.

According to the above-described embodiment of the present invention, scattered beam noise can be remarkably reduced by using a common optical path-type optical system in which a reference beam and an object beam propagate through the same optical path and using a color filter that absorbs the reference beam. In the above-described embodiment of the present invention, a hologram recording medium including a cholesteric liquid crystal filter that selectively reflects an object beam is used. However, the same effect or similar may be obtained by using a hologram recording medium including an aluminum layer as a reflection layer, as shown in FIGS. 7 and 8.

A recording operation and a reproducing operation using a hologram recording medium including an aluminum layer as a reflection layer will now be described with reference to FIGS. 7 and 8. The polarizations of an object beam and a reference beam input to the hologram recording medium are the same as in the above-described embodiment of the present invention.

Figure 7:
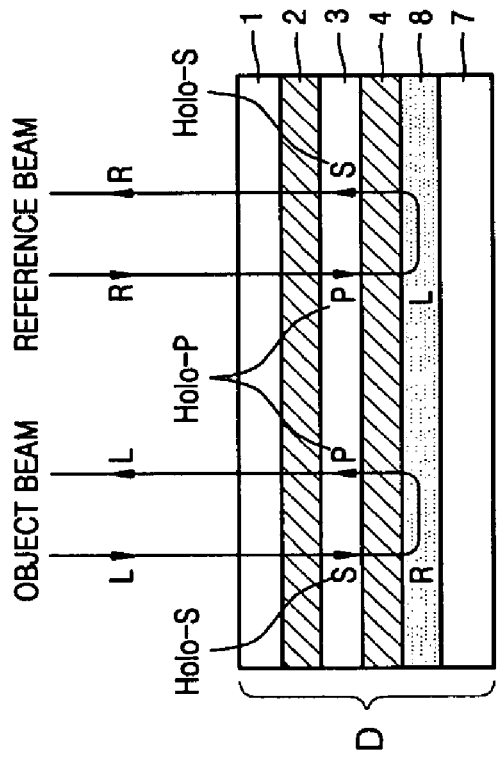
FIG. 7 illustrates a recording operation using a hologram recording medium according to another embodiment of the present invention having a different reflection layer.
Figure 8:
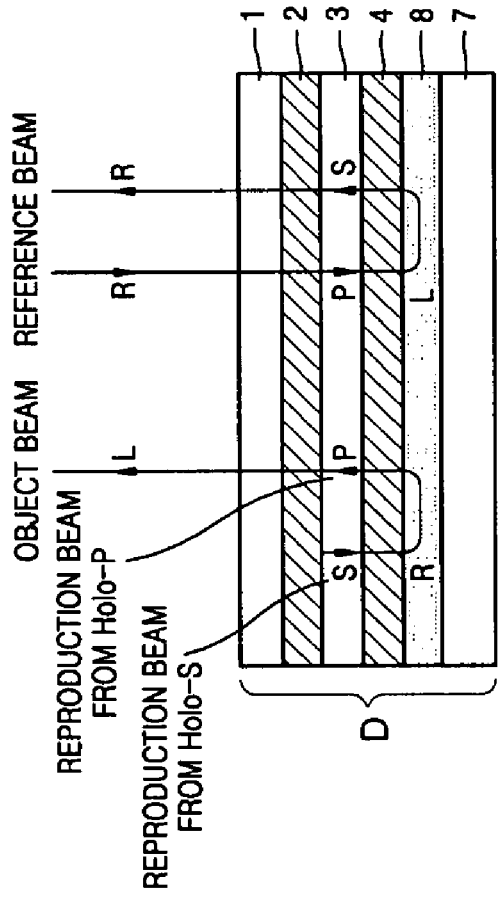
FIG. 8 illustrates a reproducing operation using a hologram recording medium according to another embodiment of the present invention having a different reflection layer.
Figure 9:
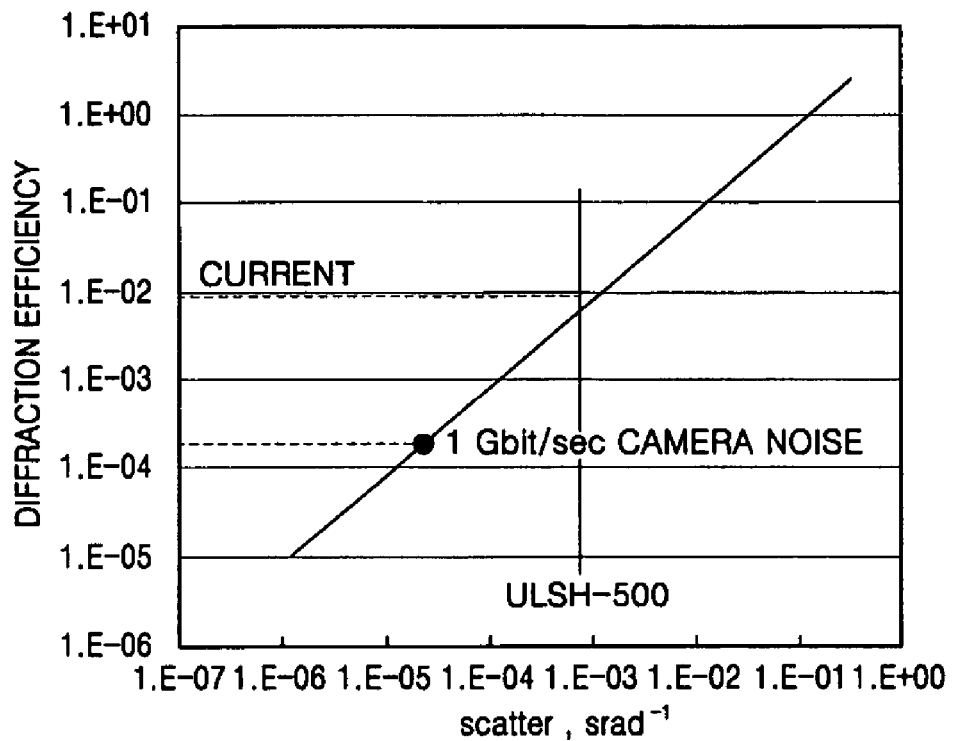
FIG. 9 is a graph illustrating the relationship between the amount of scattered light and diffraction efficiency in a conventional hologram recording medium.
Figure 10:
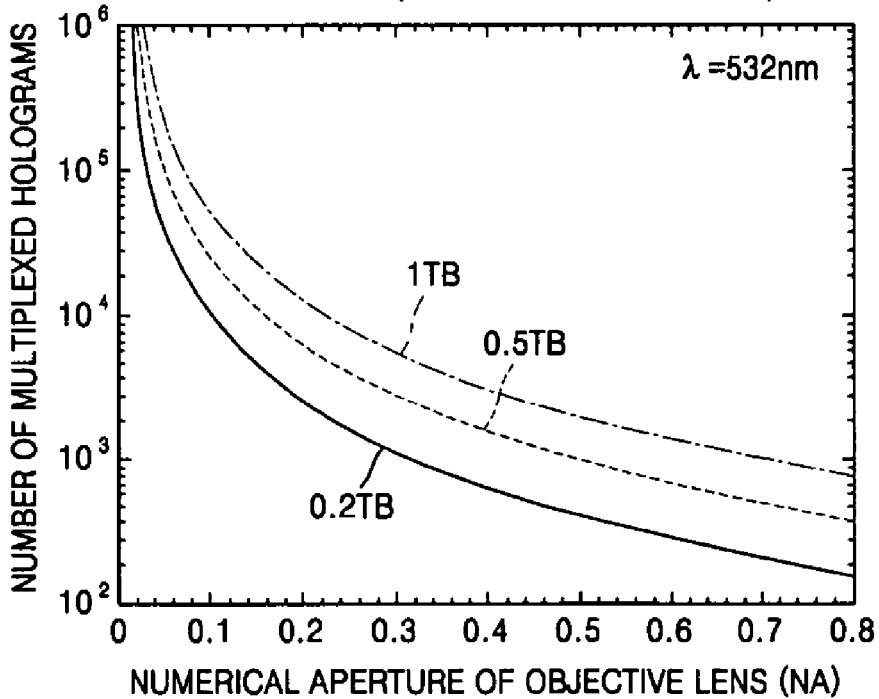
FIG. 10 is a graph illustrating the relationship between numerical aperture of an objective lens and number of multiplexed holograms.
Figure 11:
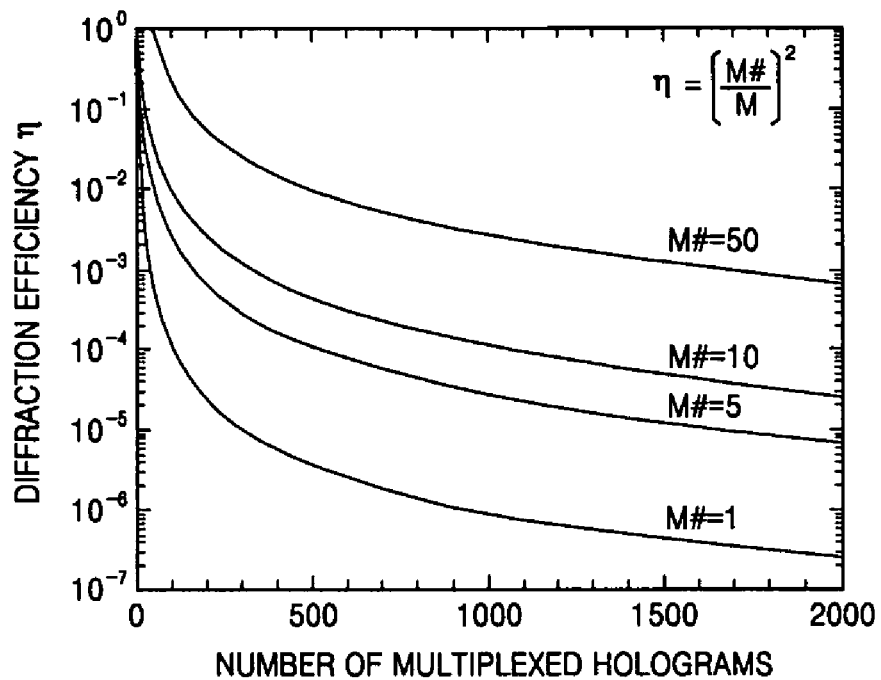
FIG. 11 is a graph of diffraction efficiency versus number of multiplexed holograms.
Figure 12:
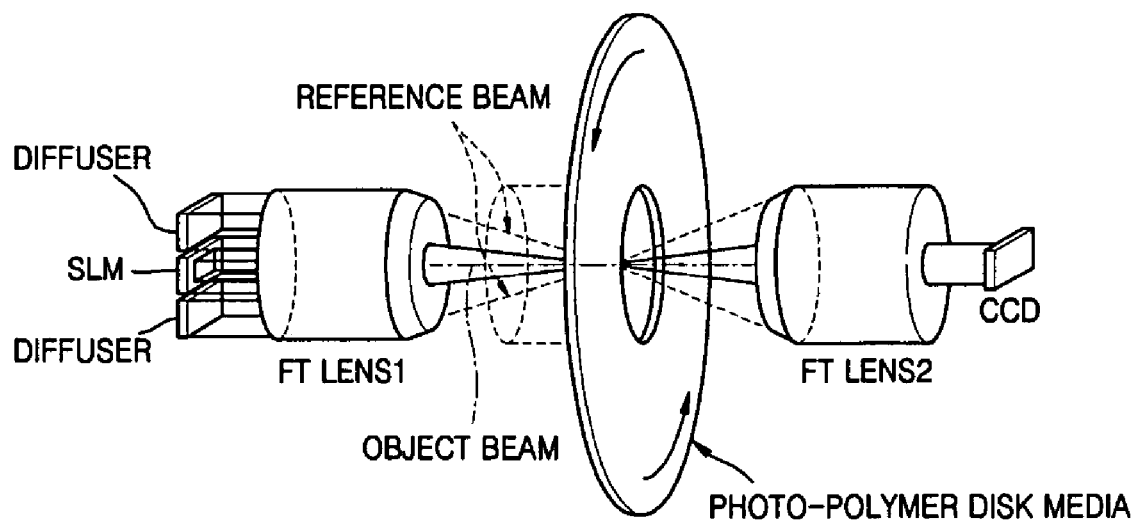
FIG. 12 is a perspective view of a conventional optical system.

Referring to FIG. 7, the object beam input to the hologram recording medium is a left circular-polarized beam L. When the object beam passes through the phase difference layer A 2, the object beam becomes an S-polarized beam in the recording layer 3 of the hologram recording layer. When the object beam passes through the phase difference layer B 4 underlying the recording layer 3, the object beam is converted into a right circular-polarized beam R and is reflected from the reflection layer 8. The object beam reflected from the reflection layer 8 passes back through the phase difference layer B 4 where the reflected object beam is converted into a P-polarized beam and input to the recording layer 3.

Meanwhile, the reference beam input to the hologram recording layer is a right circular-polarized beam. The reference beam passes through the phase difference layer A 2 where the reference beam is converted into a P-polarized beam before entering the recording layer 3. The reference beam passes through the phase difference layer B 4 underlying the recording layer 3 and is converted into a left circular-polarized beam L and reflected from the reflection layer 8. The reference beam reflected from the reflection layer 8 passes through the phase difference layer B 4 and is converted into an S-polarized beam and input to the recording layer 3.

In the recording layer 3, the S-polarized object beam and the S-polarized reference beam interfere with each other to record a hologram Holo-S. In addition, the P-polarized object beam and the P-polarized reference beam interfere with each other to record a hologram Holo-P.

When reproducing a hologram, a right circular-polarized reference beam is input to the hologram recording medium as shown in FIG. 8. The reference beam is transmitted through the phase difference layer A 2 and is converted into a P-polarized beam before entering the recording layer 3. When radiating the reference beam onto the Holo-P, a reproduction beam from the Holo-P passes through the phase difference layer A 2 and is converted into a left circular-polarized beam L and input back into the optical system.

The reference beam transmitted through the phase difference layer B 4 is converted into a left circular-polarized beam L and reflected from the reflection layer 8. The reference beam passes through the phase difference layer B 4 and is converted into an S-polarized beam before entering the recording layer 3. When radiating the reference beam onto the Holo-S, a reproduction beam from the Holo-S passes through the phase difference layer B 4 twice and passes through the phase difference layer A 2 to be converted into a left circular-polarized beam L and input back into the optical system. Accordingly, even when the reflection layer is formed of an aluminum layer, the polarizations of the object beam and the reference beam may be the same so long as they are opposite in all other layers except the recording layer 3.

According to the present invention, scattered beam noise, which is one of the most serious problem in a common optical path-type optical system in which a reference beam and an object beam propagate through the same optical path, may be minimized by ensuring that the object beam and the reference beam are perpendicular in polarization in all layers of a recording medium except the recording layer, and including in the recording medium a reflection layer that transmits the reference beam and reflects the object beam and a color filter underlying the reflection layer that absorbs the reference beam. In addition, the structure of the optical system may be simplified and its recording capacity increased.

Additionally, it is understood that the medium can be realized in a disc shape (such as a CD or DVD), has a card shape (such as a floppy disc or a secure digital card), or a tape shape (such as a cassette tape or reel-to-reel type memory).

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A hologram recording medium comprising:
   a recording layer into which an object beam and a reference beam are radiated to record data of the object beam on the recording layer as interference fringes;
   first and second phase difference layers arranged in contact with and above and below the recording layer, respectively, to convert a polarization of the object and reference beams incident to the first and second phase difference layers; and
   a reflection layer disposed such that the second phase difference layer is between the reflection layer and the recording layer.

2. The hologram recording medium of claim 1, wherein the reflection layer selectively reflects the object beam.

3. The hologram recording medium of claim 1, further comprising:
   a filter layer to absorb the reference beam and which is disposed such that the reflecting layer is between the filter and second phase difference layers.

4. A recording/reproducing apparatus for use with a hologram recording/reproducing medium, the apparatus comprising:
   a beam emitter to emit object and reference beams; and
   a beam focusing unit disposed between the beam emitter and the medium to focus the object and reference beams on the medium, and to transfer data with respect to a recording layer of the medium, the medium comprising:
   a first phase difference layer in contact with and above the recording layer to convert a polarization of the object and reference beams;
   a second phase difference layer in contact with and below the recording layer to convert a polarization of the object and reference beams; and
   a reflection layer disposed such that the second phase difference layer is between the reflection layer and the recording layer, wherein the object and reference beams are radiated onto the recording layer, disposed between the first and second phase difference layers, at a same portion thereof to record data as interference fringes and wherein the reference beam is radiated onto the recording layer to reproduce the data recorded as the interference fringes from the recording layer.

5. The apparatus according to claim 4, wherein the medium further comprises a cholesteric liquid crystal filter having a periodic spiral molecular structure to selectively reflect light of a wavelength determined by the period of the spiral molecular structure thereof.

6. The apparatus according to claim 5, wherein the cholesteric liquid crystal filter comprises a right circular cholesteric liquid crystal having a circular dichroism to reflect right circular-polarized beams and to transmit left circular-polarized beams.

7. The apparatus according to claim 4, wherein the medium further comprises:

a cover layer to protect an inside of the medium;
a color filter to absorb a reproducing beam generated from the reference beam; and
a substrate to provide a base of the medium.

8. The apparatus according to claim 4, wherein the recording layer comprises a photo polymer.

* * * * *